United States Patent [19]

Cook

[11] Patent Number: 5,221,990

[45] Date of Patent: Jun. 22, 1993

[54] WIDE FIELD OF VIEW AUTOMOTIVE REAR VISION OPTICAL SYSTEM

[75] Inventor: Lacy G. Cook, El Segundo, Calif.

[73] Assignee: Hughes Aircraft Company, Los Angeles, Calif.

[21] Appl. No.: 848,592

[22] Filed: Mar. 9, 1992

[51] Int. Cl.⁵ .......................... G02B 5/08; G02B 5/10; G02B 23/00

[52] U.S. Cl. .................... 359/399; 359/850; 359/859; 359/861

[58] Field of Search .................. 359/362–366, 359/399–432, 503–506, 838, 844, 850–866, 726–731

[56] References Cited

U.S. PATENT DOCUMENTS

| | | | |
|---|---|---|---|
| 3,645,607 | 2/1972 | Whitney | 359/861 |
| 3,909,117 | 9/1975 | Takahashi et al. | 359/850 |
| 4,114,989 | 9/1978 | Badgley | 359/861 |
| 4,265,510 | 5/1981 | Cook | 359/366 |
| 4,893,915 | 1/1990 | Taguma | 359/861 |
| 4,964,706 | 10/1990 | Cook | 359/366 |
| 5,009,494 | 4/1991 | Iossi et al. | 359/366 |

FOREIGN PATENT DOCUMENTS

| | | | |
|---|---|---|---|
| 1154631 | 5/1985 | U.S.S.R. | 359/861 |
| 1534545 | 12/1978 | United Kingdom | 359/861 |

Primary Examiner—Bruce Y. Arnold
Assistant Examiner—Thong Nguyen
Attorney, Agent, or Firm—William J. Streeter; Wanda K. Denson-Low

[57] ABSTRACT

The present optical system (20) provides an all-reflective vehicle rear vision optical system. A planar mirror (22), acting like a conventional vehicle rearview mirror, would be positioned to receive a beam. The beam would be provided by an image erecting assembly (30) which, in turn, would reflect the beam into a three-mirror anastigmat telescope (24, 26 and 28) to provide rearward image beam to the first planar mirror and in turn, to the exit pupil (25). The optical system provides a 2X magnification at a wide field of view which substantially eliminates blind spots.

14 Claims, 4 Drawing Sheets

WIDE FIELD OF VIEW AUTOMOTIVE REAR VISION OPTICAL SYSTEM

BACKGROUND OF THE INVENTION

1. Technical Field

The present invention relates to an all-reflective optical system and, more particularly, to a wide field of view vehicle rear vision optical system.

2. Discussion

It has long been desirable when driving a vehicle to view traffic rearward of the driver. To accomplish rear viewing of traffic, the automotive industry has provided vehicles with rearview and sideview mirrors. Rearview mirrors are ordinarily mounted either on the windshield or the roof of the vehicle inside the passenger compartment of the vehicle. A ray trace of such a system is illustrated in FIG. 1. Rearview mirrors enable drivers to view rearward traffic in a rectangular field typically no greater than 6 degrees by 30 degrees. This field of view restriction is usually imposed by the size of the mirror or the size of the rear window in the vehicle. Sideview mirrors can increase this field of view somewhat. Generally, the sideview mirrors can be either planar or convex, and if convex, they operate at high magnifications significantly distorting real world spatial relationships.

The major disadvantage of these types of mirror systems is that, depending upon the vehicle, blind spots can exist to the driver. These blind spots are very dangerous and can cause a driver to glance in his mirror system and fail to see a vehicle in his blind spot. One attempt to eliminate blind spots is a large segmented planar mirror array within the passenger compartment across the roof of the vehicle. This type of array is unsatisfactory because of the discontinuous nature of the fields and the inherent limitations of viewing through the passenger compartment. Thus, it is desirous to have a rear vision optical system which substantially eliminates blind spots.

SUMMARY OF THE INVENTION

According to the teachings of the present invention, an all-reflective rear vision optical system is provided which substantially eliminates blind spots. The present invention provides an afocal optical system having a 2X magnification which is configured to be roof mounted in a vehicle. The present invention may be standard equipment or may be retrofitted for use with conventional rearview mirror systems. The present invention provides a rear vision optical system with a n unobstructed rectangular field of view greater than 8 degrees vertically by 60 degrees horizontally. Also, the present invention maintains the same image orientation as conventional planar rearview mirrors.

In the preferred embodiment the all-reflective rear vision optical system is comprised of the following. A single fold mirror is positioned within the vehicle and is adjustable by the driver. This single fold mirror provides a driver with a view of the scene rearward of his position within the vehicle. An afocal three-mirror anastigmat provides a magnified view of the scene. A reflective image erecting assembly provides the scene to the three-mirror anastigmat. Thus, the image erecting assembly is positioned to receive light rays from the scene and direct them to the three-mirror anastigmat which, in turn, receives and directs the rays to the single fold mirror which receives and ultimately directs the rays to the driver's eyes.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
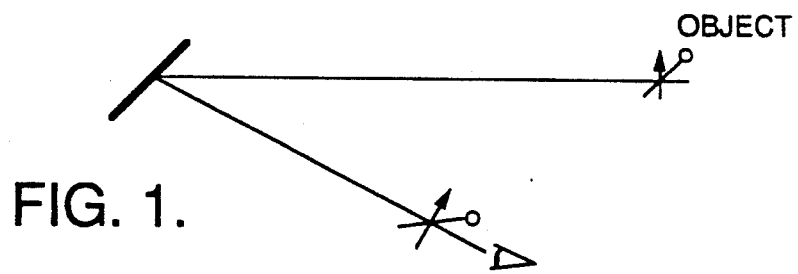
FIG. 1 is a schematic diagram of an image orientation of a conventional vehicle rear view mirror optical system.
Figure 2:
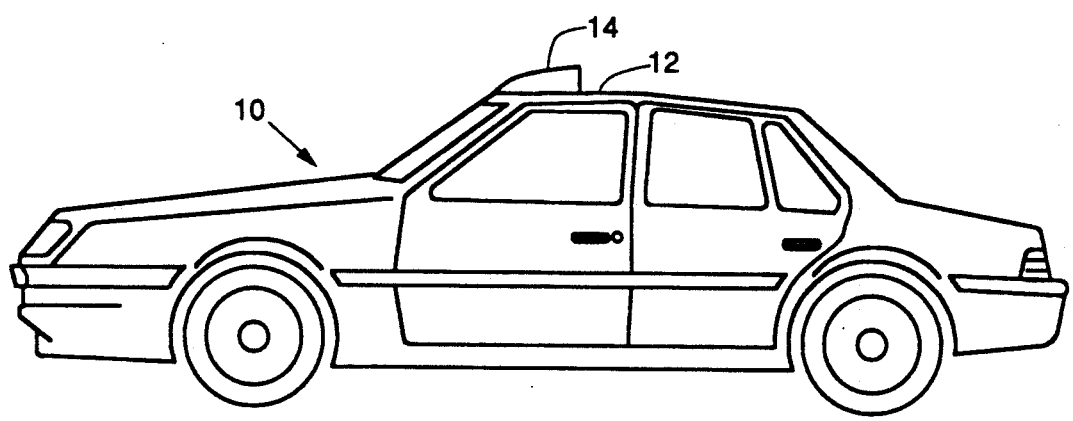
FIG. 2 is a perspective view of a vehicle including the rear vision optical system of the present invention.
Figure 3:
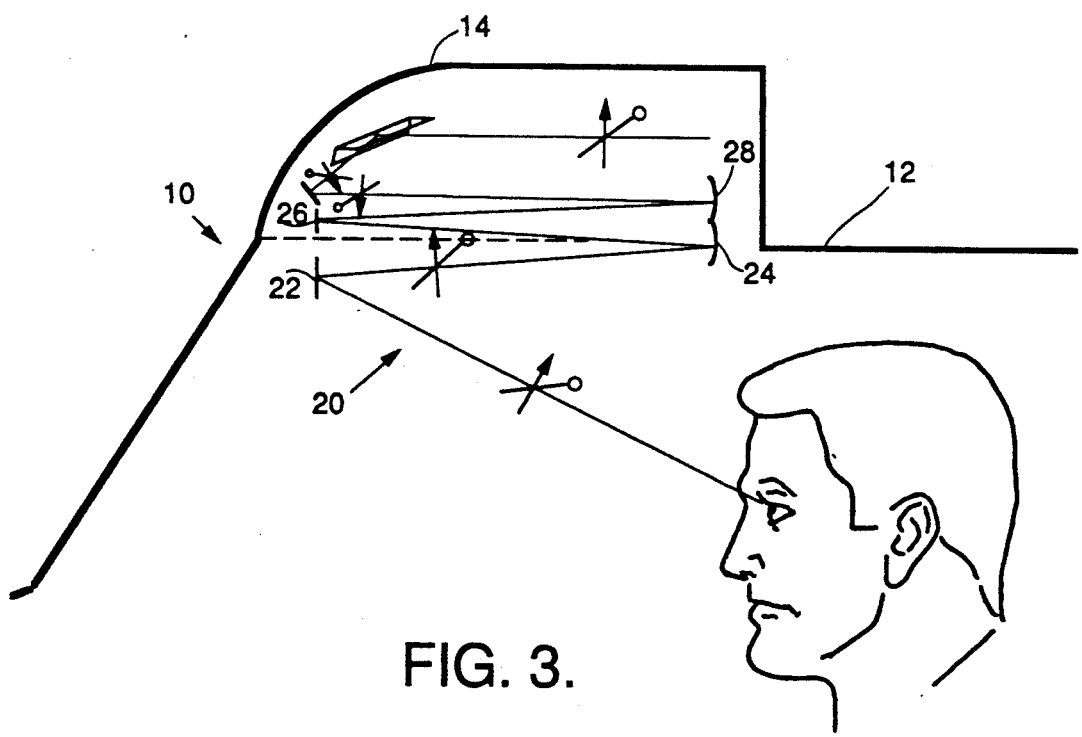
FIG. 3 is a sectional view of FIG. 1 with a driver in phantom through line 2—2 thereof with an image orientation of the present invention.

Turning to the figures, particularly FIGS. 2 and 3, a vehicle 10 is illustrated. The vehicle 10 includes a roof panel 12 which supports a housing 14 which houses a portion of the optical system 20 which is best illustrated in FIG. 3.

The optical system 20 generally includes a single fold mirror 22, a primary 24, a secondary 26 and tertiary mirror 28 forming an afocal three-mirror anastigmat, and an image erecting assembly 30.

The single fold mirror 22 is like those that are currently utilized in vehicles for rearview mirrors. The single fold mirror 22 would be positioned in the vehicle 10 on the vehicle windshield or the roof panel 12 as is customary in the automotive industry. The planar mirror 22 is adjustable to provide different drivers with a rearward view of traffic. The adjustability of the single fold mirror 22 enables the mirror to direct the rays to the driver's eyes, and positions the system exit pupil 25 at the driver's eyes. The mirror 22 is generally planar and is a non-power mirror.

Figure 4:
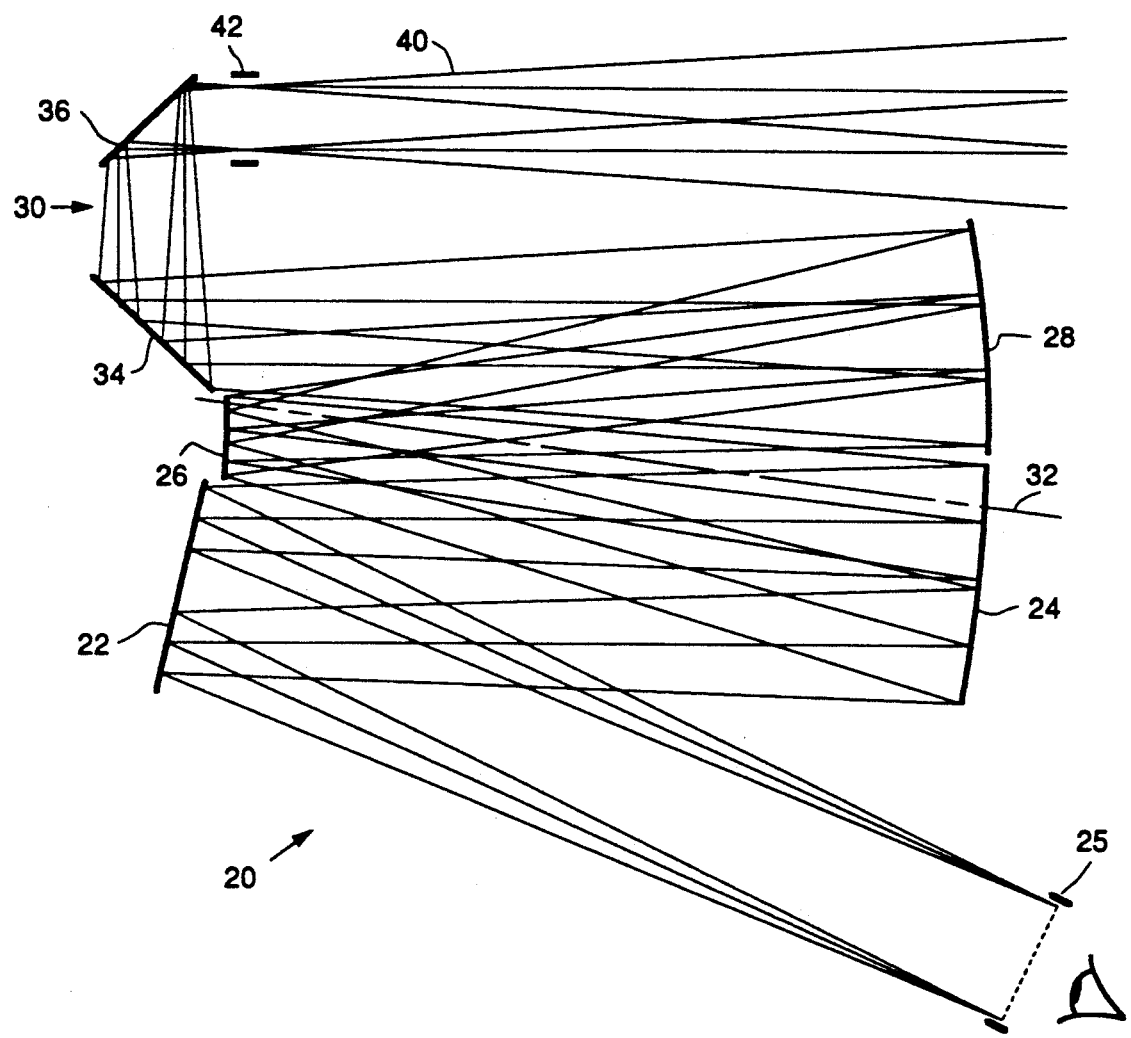
FIG. 4 is a schematic diagram of a vertical raytrace section of an optical system in accordance with the present invention.
Figure 5:
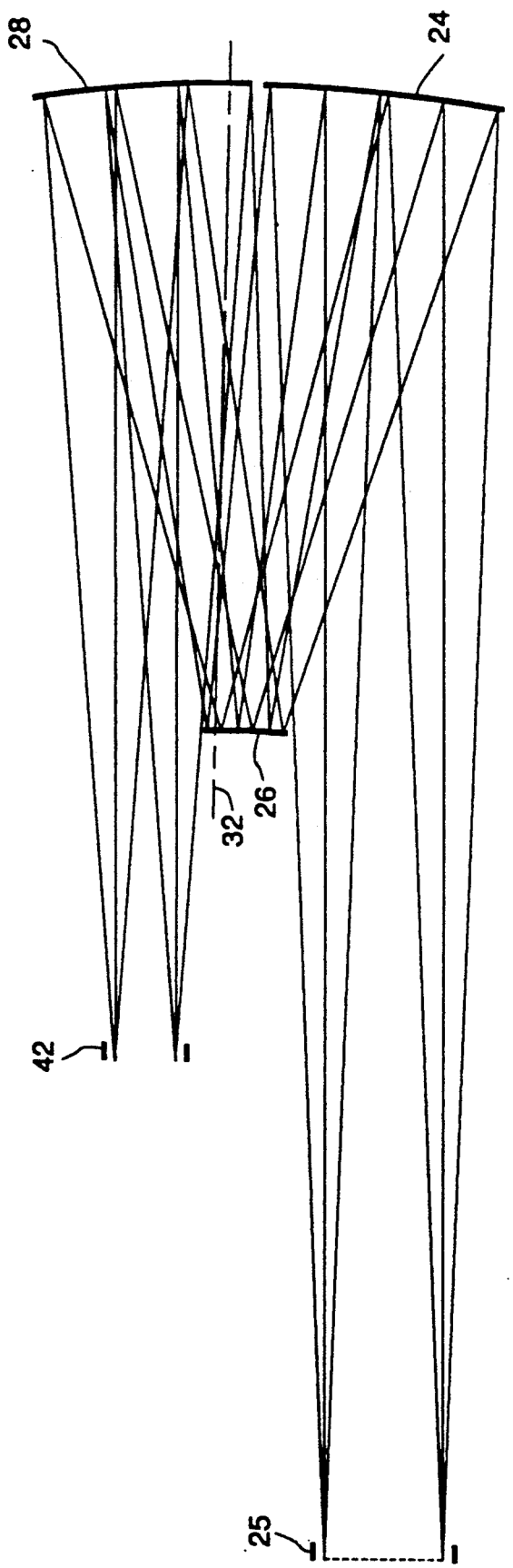
FIG. 5 is a vertical raytrace section of an unfolded 2X afocal three-mirror anastigmat.
Figure 6:
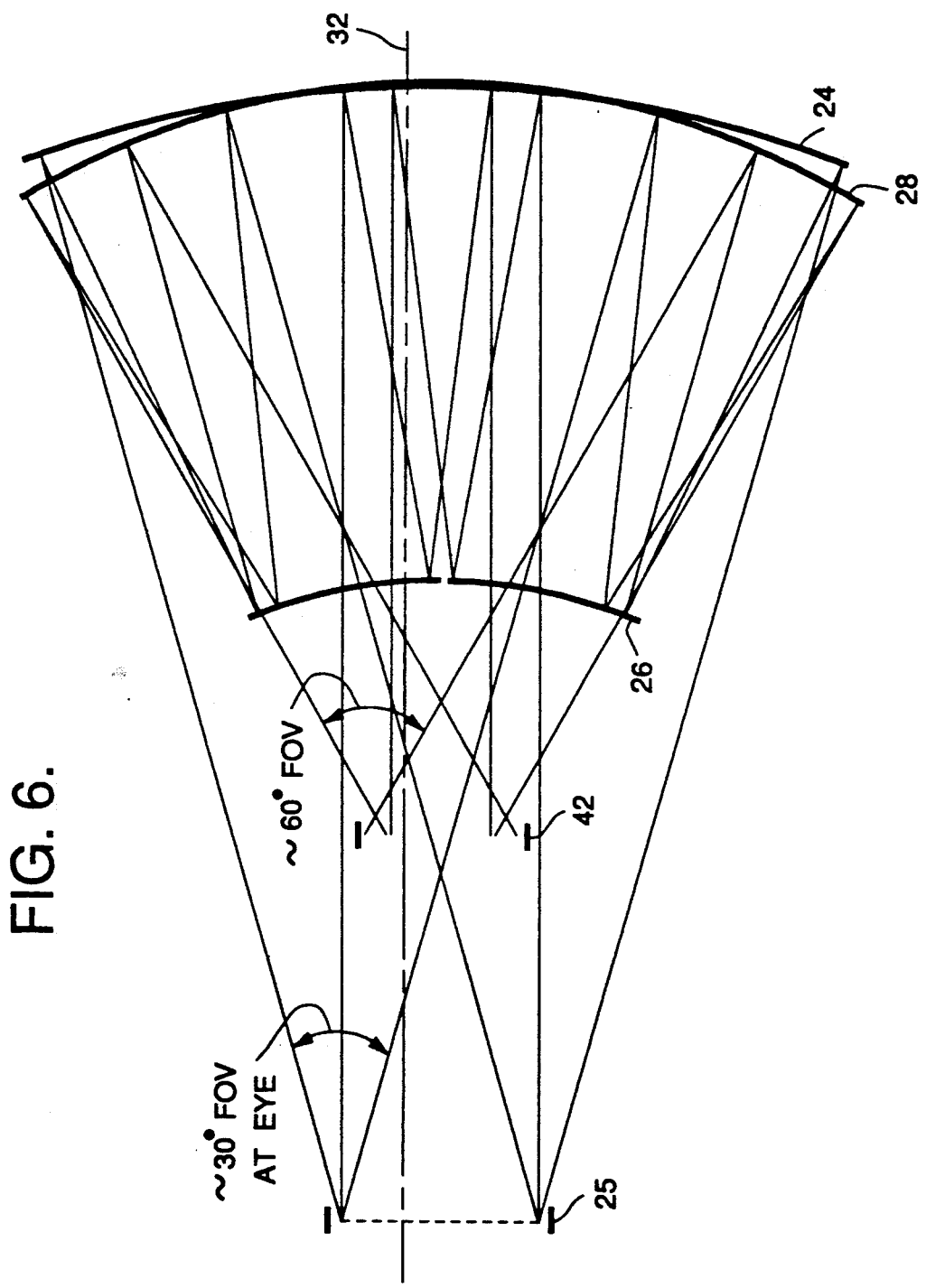
FIG. 6 is a horizontal raytrace section of an unfolded 2X afocal three-mirror anastigmat.

The three-mirror anastigmat include the primary 24, secondary 26 and tertiary mirror 28 as best illustrated in the raytraces of FIGS. 4, 5 and 6. In FIG. 4 a three-mirror anastigmat is folded, reflecting rays from the image erecting assembly 30 and directing the rays to the fold mirror 22.

The primary mirror 24 includes an axis 32 defining the three-mirror anastigmat optical axis. The primary mirror 24 is a positive power mirror having a mirror surface which may be a spheric, conic, or higher order aspheric.

The secondary mirror 26 is a negative power mirror. The secondary mirror 26 has a mirror surface which may be a spheric, conic, or higher order aspheric.

The tertiary mirror 28 is a positive power mirror. The mirror surface of the tertiary mirror 28 may be of a spheric, conic, or a higher order aspheric.

The power of the two positive mirrors is balanced by the negative power of the secondary mirror to provide a zero Petzval curvature or a flat field condition. The primary and secondary mirrors form the "objective" and the positive tertiary mirror forms a reflective "eyepiece" of the system, which recollimates the beam. This type of system, with the exit pupil 25 out in front of the primary mirror 24, has a real entrance pupil 42. Also, an intermediate image is created by the afocal three-mirror anastigmat telescope between the secondary and tertiary mirrors.

being about 15 inches wide. However, the dimensions are subject to change depending upon the parameters of the system.

A specific prescription for the system in accordance with the present invention is as follows in reference to FIGS. 5 and 6.

TABLE 1

Optical Prescription of a Specific Embodiment of the Optical System of the Present Invention

| Element Description | Radius | CC | AD | AE | THK | MATL | DEC |
|---|---|---|---|---|---|---|---|
| Exit Pupil (25) | ∞ | — | — | — | 20.000 | AIR | −2.000 |
| Primary Mirror (24) | −20.000 | −.2052 | −.3576 × $10^{-6}$ | −.2252 × $10^{-9}$ | −8.724 | REFL | — |
| Secondary Mirror (26) | −8.300 | −.7708 | −.1497 × $10^{-3}$ | .1766 × $10^{-4}$ | 8.744 | REFL | — |
| Tertiary Mirror (28) | −14.196 | 0.2546 | .1862 × $10^{-4}$ | .9393 × $10^{-7}$ | −13.231 | REFL | — |
| Entrance Pupil (42) | ∞ | — | — | — | — | AIR | 1.000 |

Entrance pupil size
0.75 vert by 1.75 horz, inches
Entrance field of view
8.0 vert by 64.0 horz, degrees
Exit pupil size
1.5 vert by 3.50 horz, inches
Exit field of view
4.0 vert by 32.0 horz, degrees
Magnification Ratio = 2×
(+) Distance are to the right along primary mirror optical axis
(+) Radii have centers to the right
(+) Decenters are up
(+) Tilts are counterclockwise, degrees
CC Conic Constant = −(Eccentricity)$^2$
Decenters are done before tilting
Thicknesses are between mirror vertices before decenters and tilts are applied.
All dimensions are in inches unless specified otherwise.

The image erecting assembly 30 generally includes a pair of fold mirrors 34 and 36 with mirror 36 being a roof mirror, itself composed of two mirrors joined at right angles as seen in FIG. 3. The erecting mirrors 34 and 36 point the line of sight rearward to restore nominal image orientation. The erecting mirrors 34 and 36, are generally non-powered planar mirrors. Generally due to the positioning of the erecting mirrors 34 and 36 above the vehicle, the erecting mirrors 34 and 36 are formed as a corner cube arrangement.

In operation, a scene rearward of the vehicle is viewed through the entrance pupil 42 by the erecting roof mirror 36. The energy, illustrated by rays 40, is reflected from the mirror 36 to the mirror 34. The energy received by the erecting mirror 34 is reflected to the tertiary mirror 28, from the tertiary mirror 28 to the secondary mirror 26 and from the secondary mirror 26 to the primary mirror 24. During reflecting, the image is inverted and reverted by the system to provide a rear view of the scene which is customary to the driver. The energy from the primary mirror 24 is received and reflected to the planar mirror 22. The planar mirror 22 reflects the energy to the exit pupil 25 which is designated at the driver's eyes. The three-mirror anastigmat telescope provides the basic imaging function of the optical system. The three-mirror anastigmat provides a 2X magnification into a rectangular 0.75 by 1.75 inch entrance pupil with a rectangular 8 by 64 degrees field of view to the outside. This field of view is generally twice that provided by conventional planar rearview mirrors. At the 1.5 by 3.5 inches exit pupil, the driver then sees a 4 by 32 degrees field of view. The roof mount along with the wide field of view substantially eliminates all blind spots that are present in conventional mirror systems.

FIGS. 5 and 6 illustrated unfolded vertical and horizontal raytrace sections of the afocal three-mirror anastigmat telescope. The very wide, approximately 60 degrees field of view, along with an exit pupil of about 3.5 inches result in the primary and tertiary mirrors The present invention has application in both original equipment manufacture and aftermarket automotive optical systems to provide improved rearward vision. The present invention would provide increased safety since dangerous blind spots would be substantially eliminated. The roof mounting of the optical system could be integrated with other potential roof mounted devices such as fore and aft looking night driving FLIR devices or vision enhancement systems, collision avoidance radar, auxiliary stoplights, fog lights or the like into an attractive integral streamlined unit. Also, it is anticipated that the present system would be inexpensive and available at reasonable cost to vehicle manufacturers and aftermarket suppliers.

It should be understood that while this invention has been described in connection with a particular example hereof, that various modifications, alterations and variations of the preferred embodiments can be made after having the benefit of the study of the specification, drawings and subjoined claims.

What is claimed is:

1. A vehicle rearview optical system comprising:
   first reflecting means for providing a driver with a rear view of a scene, said reflecting means being adjustable to accommodate viewing by the driver;
   second reflecting means for providing a magnified image of said scene, said second reflecting means positioned to reflect rays to said first reflecting means to provide a wide field of view of the scene to the driver, and
   wherein said second reflecting means includes an afocal three-mirror anastigmat telescope providing magnification of said scene being viewed.

2. The rearview optical system according to claim 1 wherein the vehicle has a roof and said second reflecting means is adapted to be positioned on the vehicle roof.

3. The rearview optical system according to claim 1 wherein said second reflecting means includes a reflecting image erecting assembly for providing a view of the scene and directing the scene to said afocal three-mirror anastigmat telescope.

4. A rearview optical system for a vehicle comprising:
- a single fold mirror adapted to be positioned within a vehicle and adjustable by a driver, said single fold mirror providing the driver with a view of a scene rearward of his position within the vehicle;
- an afocal three-mirror anastigmat telescope for providing a magnified image of said scene, said three-mirror anastigmat positioned to direct rays from the viewed scene to said single fold mirror; and
- reflective image erecting assembly for providing said scene to said three-mirror anastigmat telescope, said image erecting assembly positioned to direct ray from said scene to said three-mirror anastigmat telescope to provide a wide field of view of the scene to the driver.

5. The rearview optical system according to claim 4, wherein said three-mirror anastigmat telescope includes all powered mirrors.

6. The rearview optical system according to claim 4 wherein said image erecting assembly includes a trio of planar fold mirrors.

7. The rearview optical system according to claim 4 wherein the vehicle has a roof and said three-mirror anastigmat telescope and image erecting assembly are adapted to be positioned on the vehicle roof.

8. The rearview optical system according to claim 7 wherein said system substantially eliminates blind spots in the driver's view of the scene rearward of his position in the vehicle when utilized in the vehicle.

9. The rearview optical system according to claim 4 wherein magnification of said three-mirror anastigmat telescope is 2X.

10. A vehicle including a rearview optical system comprising:
- a vehicle having a roof panel, said roof panel forming a top of a passenger compartment;
- a single fold mirror positioned within said passenger compartment and being adjustable by a driver, said single fold mirror providing the driver with a view of a scene rearward of his position within the vehicle passenger compartment;
- an afocal three-mirror anastigmat telescope for providing a magnified image of said scene, said three-mirror anastigmat positioned on said vehicle roof panel to direct rays of the viewed scene to said single fold mirror; and
- a reflecting image erecting assembly for providing said scene to said three-mirror anastigmat telescope, said image erecting assembly positioned to direct ray from said scene to said three-mirror anastigmat telescope to provide a wide field of view of the scene to the driver.

11. The vehicle according to claim 10 wherein said three-mirror anastigmat telescope includes all powered windows.

12. The vehicle according to claim 11 wherein two of said mirrors have positive powers and the other mirror having negative power.

13. The rearview optical system according to claim 10 wherein said image erecting assembly includes a trio of planar fold mirrors.

14. The rearview optical system according to claim 10 wherein said system substantially eliminates blind spots in the driver's view of the scene rearward of his position of the vehicle when utilized in the vehicle.

* * * * *